United States Patent [19]
Dunn et al.

[11] Patent Number: 6,160,373
[45] Date of Patent: Dec. 12, 2000

[54] BATTERY OPERATED CABLELESS EXTERNAL STARTING DEVICE AND METHODS

[76] Inventors: James P. Dunn, 60 Prescott St., Worchester, Mass. 01605; David L. Ekstrom, 1830 E. Vienna, Anna, Ill. 62906

[21] Appl. No.: 09/371,731

[22] Filed: Aug. 10, 1999

Related U.S. Application Data

[60] Provisional application No. 60/095,937, Aug. 10, 1998.
[51] Int. Cl.$^7$ ........................................ H02J 7/00
[52] U.S. Cl. ................................ 320/105; 320/104
[58] Field of Search ............................ 320/105, 104, 320/103; 180/65.2–65.8

[56] References Cited

U.S. PATENT DOCUMENTS

| | | | |
|---|---|---|---|
| 4,692,680 | 9/1987 | Sherer | 320/155 |
| 5,512,387 | 4/1996 | Ovshinsky | 429/152 |

*Primary Examiner*—Peter S. Wong
*Assistant Examiner*—Lawrence Luk
*Attorney, Agent, or Firm*—Fish & Associates, LLP; Robert P. Fish

[57] ABSTRACT

A self-contained, battery powered, cableless starting device provides high DC power levels for short durations. Preferred devices have a battery, a connector terminal assembly, and a monitor/control circuit that indicates the voltage available, and limits the device output to safe voltage levels so the battery is not damaged. The connector terminal assembly preferably has 2 or more contacts, sized and dimensioned to electrically contact (mate) with selected electric starter auxiliary power input terminals. In another aspect of preferred embodiments, the coupling mechanism physically prevents the contact surface(s) from being positioned more than 5 feet from the battery. Commercial devices may advantageously include multiple batteries in a small carrying case, and have the appropriate capacity, voltage and connectors for starting a specific type of engine. For example, an especially preferred device has connectors suitable for starting a 12V or 24V powered aircraft. Such devices may advantageously have an overall stick shape, such as 2×3×14 inches, and may weigh only about 3 pounds.

20 Claims, 8 Drawing Sheets

BATTERY OPERATED CABLELESS EXTERNAL STARTING DEVICE AND METHODS

This application claims the benefit of U.S. Provisional Application No.: APPLICATION NO. FILING DATE 60/095,937 08/10/1998.

FIELD OF INVENTION

The field of the invention is external DC power supplies for use in starting aircraft engines, boat engines, automobile and truck engines, and other applications where high DC power is required for short durations.

BACKGROUND

Fuel consuming engines providing at least one, five, or ten horsepower are used to power all manner of aircraft, automobiles, boats and other passenger carrying vehicles, as well as many other devices, including non-passenger carrying vehicles and stationary devices such as generators. Numerous auxiliary DC power supplies are available for starting such engines, but since the power required for starting cannot typically be carried by a user, engines are frequently jump started using relatively long jumper cables for delivering power drawn from a power source. This is somewhat dangerous since damage to either or both vehicles can occur if the polarity is accidentally reversed, or if a spark ignites gas fumes. In addition, the second vehicle's battery must be positioned within the length of the jumper cables, which is often a problem if the disabled vehicle is tightly parked or otherwise difficult to access.

Additional problems exist where relatively long cables (i.e. cables greater than 5 feet in length) are used. For example, long cables can cause significant resistive energy losses due to the high current being transmitted, resulting in lower voltages at the engine starter, and adversely affecting starting performance. Long cables also tend to be heavy and cumbersome. Still further, long cables tend to have a relatively short lifespan due to exposure, frequent twisting, and or other stresses arising from use and storage.

Another problem that is sometimes encountered with jump starting existing vehicles is that the external auxiliary electrical contacts for receiving power may require specialized connectors, making it difficult to utilize general purpose battery packs as an external power source.

Thus there is a continuing need to develop new devices for providing auxiliary DC power for starting automobiles, boats, aircraft and other vehicles.

SUMMARY OF INVENTION

The present invention provides self-contained, battery powered, cableless starting devices for applications requiring high DC power levels for short durations, and methods of using same.

Preferred devices have a battery, a connector terminal assembly, and a monitor/control circuit that indicates the voltage available, and limits the device output to safe voltage levels so the battery is not damaged. The connector terminal assembly preferably has 2 or more contacts, sized and dimensioned to electrically contact (mate) with selected electric starter auxiliary power input terminals. In another aspect of preferred embodiments, the coupling mechanism physically prevents the contact surface(s) from being positioned more than 5 feet from the battery. Commercial devices may advantageously include multiple batteries in a small carrying case, and have the appropriate capacity, voltage and connectors for starting a specific type of engine. For example, an especially preferred device has connectors suitable for starting a 12V or 24V powered aircraft. Such devices may advantageously have an overall stick shape, such as 2×3×14 inches, and may weigh only about 3 pounds.

Contemplated methods include the steps of: providing a portable battery powered starting device containing a battery or bank of batteries; grasping and lifting the starting device in one or two hands; positioning the device so that it electrically contacts an auxiliary input terminal providing power to an electric starter, where the battery is within 5 feet of the auxiliary power input terminal; starting the engine; and then disconnecting the device.

DETAILED DESCRIPTION

Figure 1:
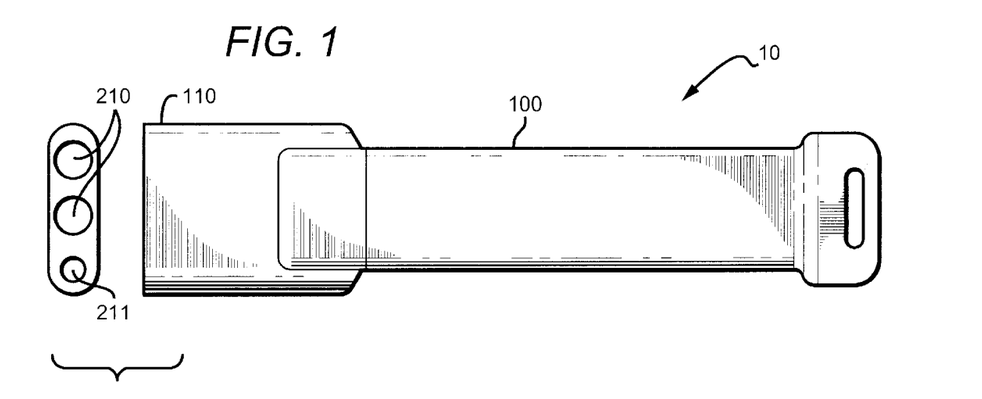
FIG. 1 is a top and edge view of an apparatus according to the present invention.

In FIG. 1, a portable, battery powered cableless starting device 10 generally includes a housing 100, connector terminals 210, and control terminal 211. The housing 100 has an elongated stick shape, with a connector terminal or plug end 110. As used herein the term "portable" means something that weighs no more than 25 pounds, and has total linear dimensions (avg. length plus avg. height plus avg. width) of no more than 108 inches.

Figure 2:
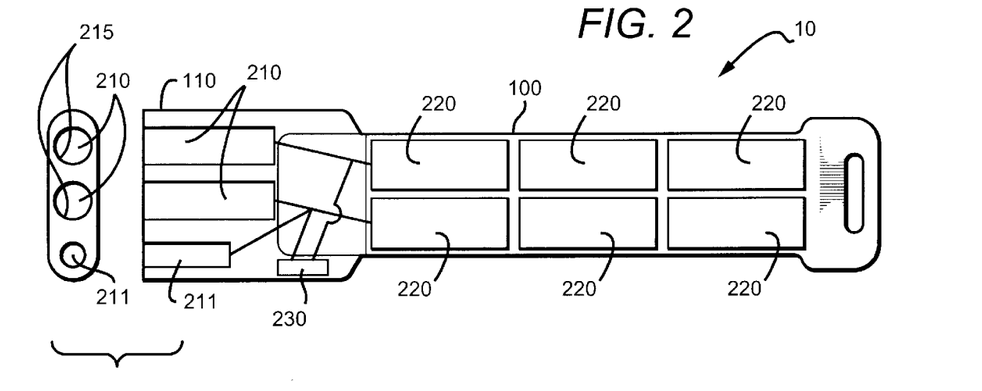
FIG. 2 and 2a is a top view of an improved (preferred embodiment) including a special monitor/control circuit board.
Figure 2A:
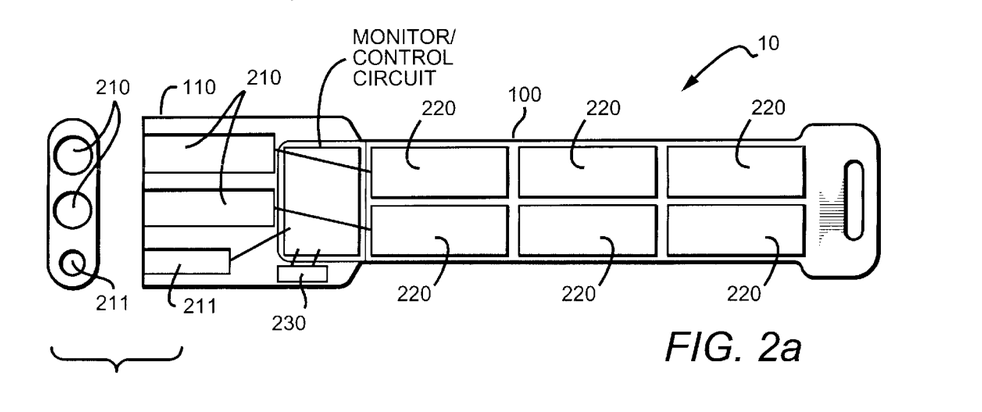

In FIG. 2, the battery powered cableless starting device 10 has, within the lower portion of housing/enclosure 100, connector terminals/contacts 210, control terminal 211, batteries 220, and recharge socket 230.

Figure 3:
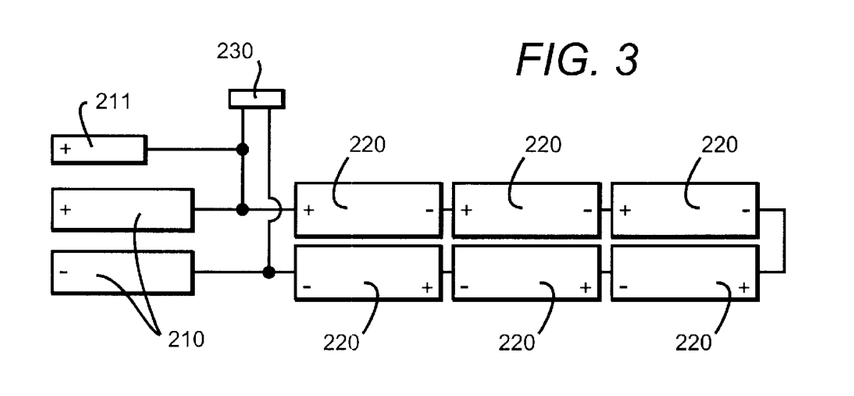
FIG. 3 is a schematic of the apparatus of FIG. 1.
Figure 3A:
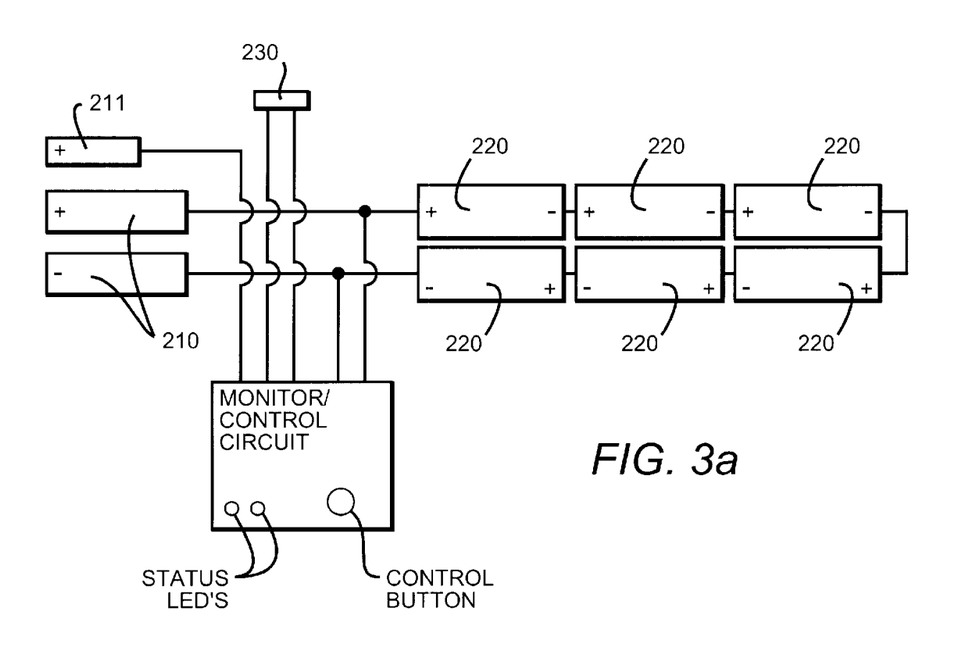
FIG. 3a is a schematic of an improved embodiment, including a special monitor/control circuit board.
Figure 4:
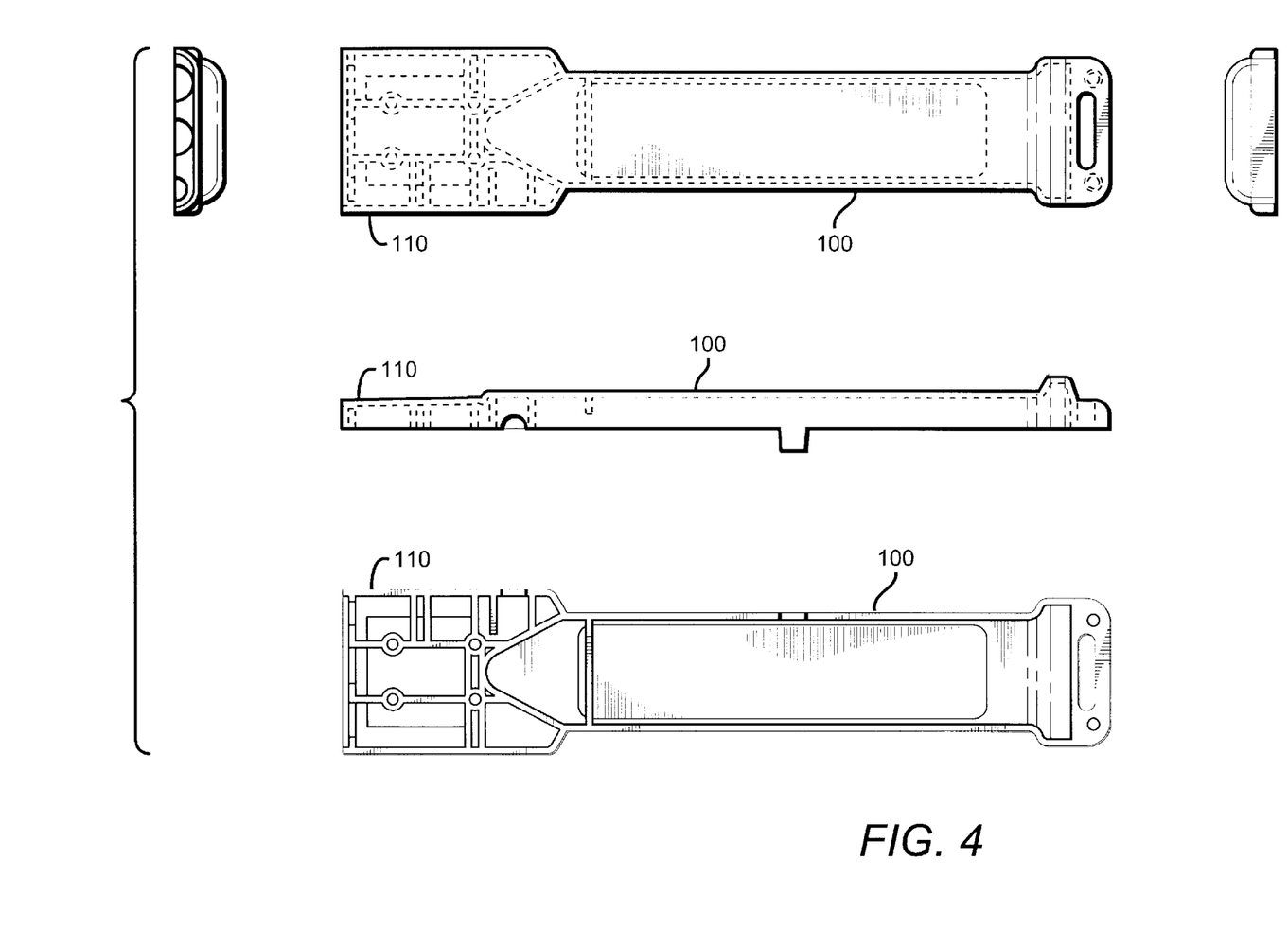
FIG. 4 is a CAD drawing of the top portion of the housing of the apparatus of FIG. 1 showing top, side, and bottom views.
Figure 5:
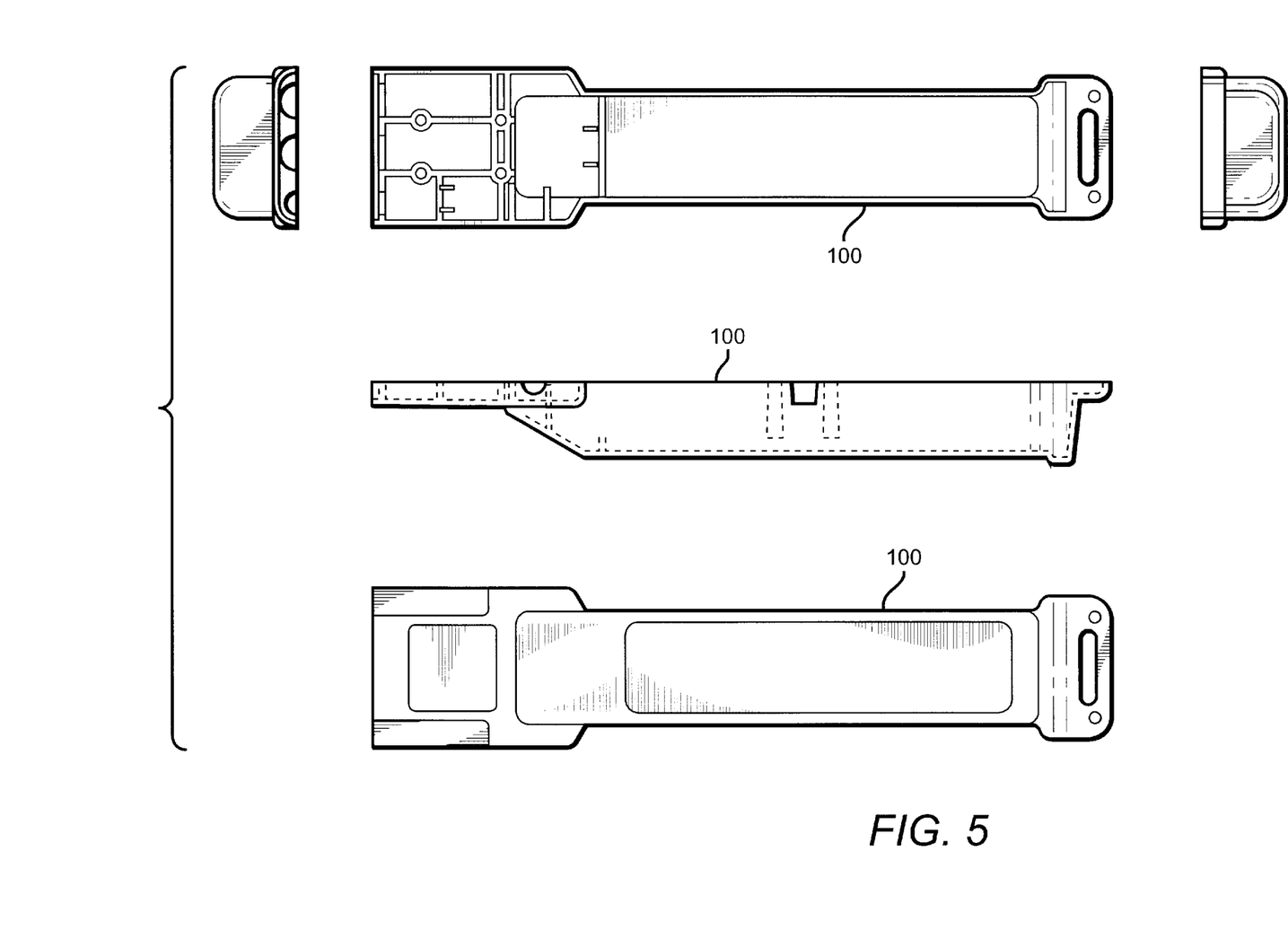
FIG. 5 is a CAD drawing of the bottom portion of the housing of the apparatus of FIG. 1 showing top, side, and bottom views.
Figure 6:
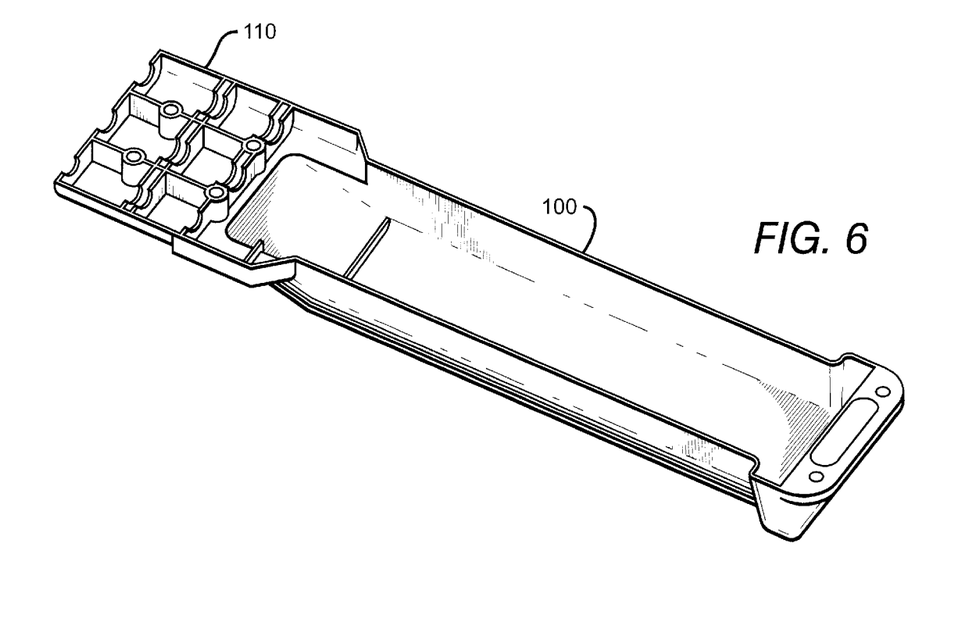
FIG. 6 is a perspective view of a bottom portion of a housing.
Figure 7:
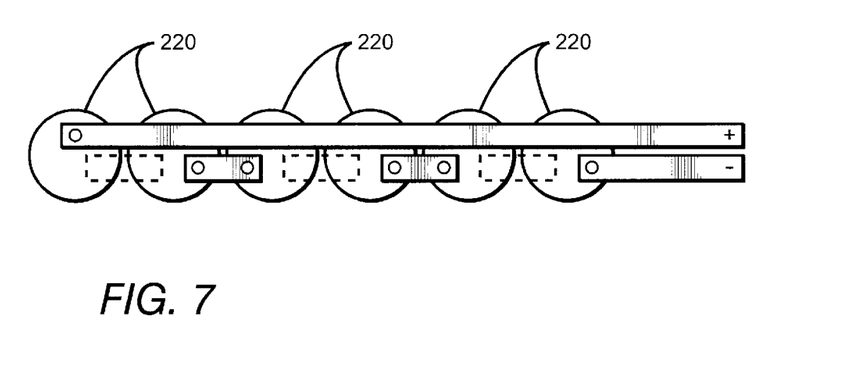
FIG. 7 is a side view of a first battery arrangement.
Figure 8:
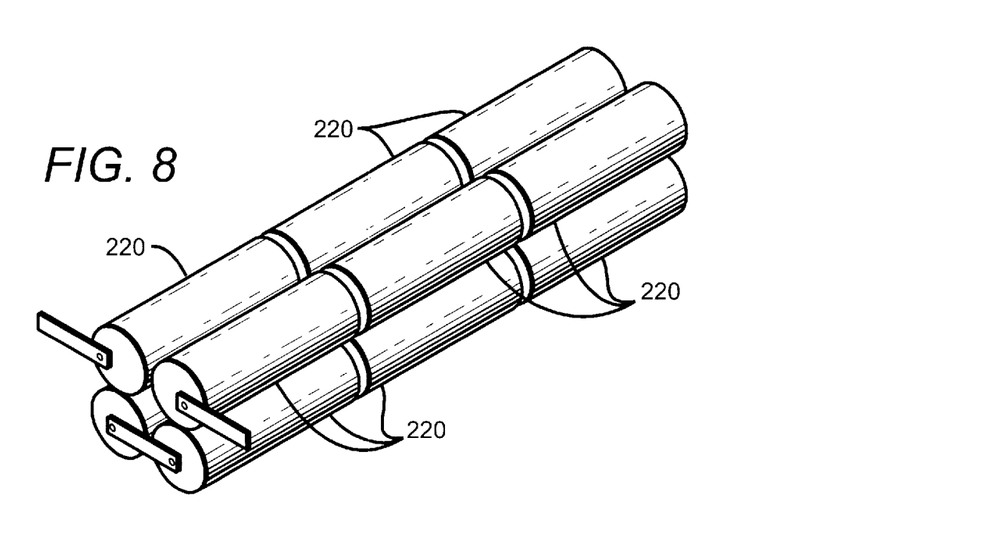
FIG. 8 is a perspective view of a second battery arrangement.
Figure 9:
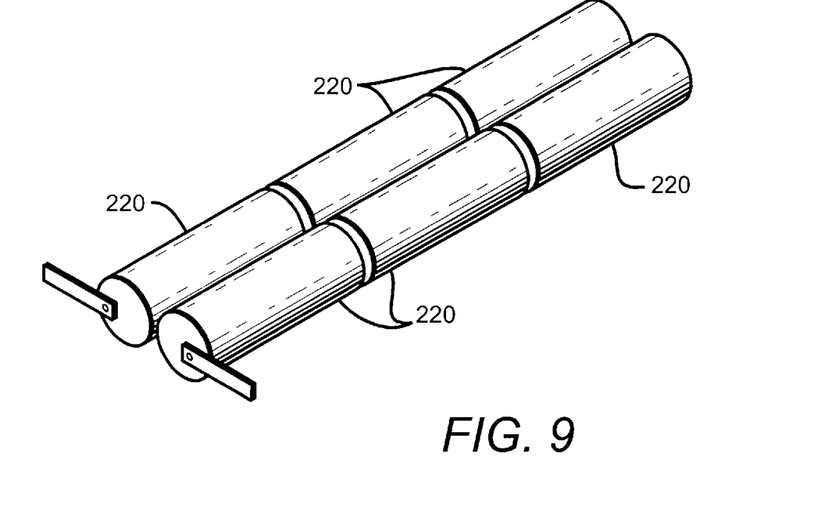
FIG. 9 is a perspective view of a third battery arrangement.

Batteries 220 (see FIGS. 2, 3, and 7–9) are preferably of the thin film type, having thin metal electrodes separated by insulating materials like glass cloth, with the electrode and cloth layers rolled up. Any suitable chemistry can be employed, including nickel cadmium, nickel zinc, nickel metal hydride, and lithium ion chemistries. Preferred batteries provide power surges of up to approximately 500 Amps for short durations, are compact in size and light in weight, operate in cold temperatures, have a relatively flat discharge voltage, are capable of storing at least 1.0 AH of energy, have little or no memory effect from partial discharge/charge cycles, generate only minor excess heat while operating, and are cost effective. The term "compact in size" is used herein to mean that an embodiment's size is kept relatively close to that of the batteries enclosed within it, and that the volume taken by the batteries is less than V cubic inches where V is 160, 120, 90, 80, 60, 50, 40, 30, or 20. The "light in weight" is used herein to indicate that an embodiment may weigh less than N lbs. where N is 50, 25, 20, 15, 10, 5, or 3. FIG. 3 shows a highly preferred embodiment in which batteries 220 are serially connected. Less preferred embodiments may, however, use other configurations such as having all the batteries in parallel, or having some batteries in parallel and some serially connected (series-parallel). Alternative embodiments may augment one or more of batteries 220 with one or more capacitors having capacitance of at least one, five, or ten farads.

Recharge socket 230 (see FIG. 2) may be included in a particular embodiments to allow recharging of the batteries 220. Recharge socket 230 may have any reasonable size or dimensions, and may be positioned in any reasonable position on device 10. Less preferred embodiments may recharge batteries 220 by providing power to connector terminals 210.

Connector terminals 210 (see FIGS. 1, 2, and 3) each have a contact surface 215 sized and dimensioned to electrically contact an auxiliary power or electric starter input terminal and are electrically coupled to batteries 220. Connector terminals 210 are preferably incorporated where applicable so as to provide easy insertion into the external power connector of various apparatus, especially aircraft and other vehicles. Of course, the connector terminals 210 and or plug end 110 may be specific to individual manufacturers, and could vary according to the nominal voltage of the electrical system. Thus, a 12 Volt DC Piper type 2-conductor connector will generally differ from a Cessna 3-conductor 24 Volt DC or NATO 24/28 Volt DC systems. In some embodiments, connector terminals 210 and or plug end 110 may be configured in a manner particularly suitable for starting a particular type of vehicle (i.e. a Cessna™ or an Piper™ airplane) or use Anderson connectors for certain starting motor connections like race cars. In other embodiments, the connector terminals 210 and or plug end 110 may be configured in a manner particularly suited for starting engines not contained in vehicles such as those utilized in power generators. Although the position of connector terminals 210 may be varied, it is preferred that connector terminals 210 be positioned at an end of the housing 100 such as plug end 110.

Plug end 110 (see FIGS. 1, 2, and 4–6) may be removably coupled to the rest of housing 100 to facilitate replacing connector terminals 210 and plug end 110 having a configuration suitable for one type of vehicle with one having a configuration suitable for another type of vehicle, or application. In such an embodiment, plug end 110 could be sized and dimensioned to be coupled to an electric power input terminal which is part of a standard connector sized and dimensioned to receive a mating connector or plug.

In addition to, or as an alternative to being removably coupled to the rest of housing 100, plug end 110 may be movably coupled to the rest of housing 100, possibly through the use of a flexible or expandable coupling. Movably coupling the plug end 110 to the rest of the housing would allow the orientation or position of the plug end to be changed relative to, and independently of, that of the rest of the housing.

Housing 100 (see FIGS. 1, 2, and 4–6) may be sized and dimensioned in a variety of ways, but it is contemplated that embodiments having housings which are approximately 1"×3"×14", 2"×3"×14", 3"×4"×15", 4"×3"×6", and 1"×3"×7"will have particular utility and may vary in weight between 1.6 and 10 lbs. Such "stick" and special shaped configurations are thought to facilitate convenient handling, and are contemplated as having a length which is between L and L+1 feet where L is 5, 4, 3, 2, 1 or 0. Although the embodiment of FIG. 1 shows a housing which at least partially encloses both the terminal connectors and the batteries, other embodiments may only partially enclose the batteries or the terminal connectors, or a subset of the batteries or terminal connectors. Alternatively, less preferred embodiments may not even have a housing but use some other coupling mechanism to keep the batteries and terminal connectors coupled. Possible alternatives may include, but are not limited to, coupling the batteries and terminal connectors to or within a flexible or a rigid rod, cable, or sleeve. Other configurations are contemplated as well, however, including a shoulder hung pack or a back pack.

It is preferred that the coupling mechanism prevents the contact surface from being positioned more than X inches from the battery where X is one of 60, 36, 24, 12, 6, 3, and 1, or alternatively prevent the distance between the contact surface and at least one battery from being varied by a factor Y where Y is greater than or equal to one of 10, 5, 2, and 1. It is thought that a device in which the distance between the contact surfaces of the connector terminals and the batteries is limited is desirable despite the potential loss of flexibility. The term "potential loss" is used because one of the advantages of the claimed device is that it is able to perform the same function as prior art devices without having many of the limitations of the prior art devices. Thus there is no need to have a special vehicle in order to use this device, nor is there any need to fuss with cables which must be coiled and uncoiled and which must be maintained, transported, and tracked in addition to maintaining, transporting, and tracking the prior art device. Furthermore, electric power losses in the connecting cables are minimized, making more power available for the starting motor.

Preferred embodiments can be readily recharged using known circuits from the electrical output of the engine generator or alternator of the device being started, or from an external AC power supply. Since preferred embodiments of the invention will hold a charge for extended periods of time, they are contemplated to be kept in airplanes or other vehicles and be available when needed. In some configurations a small additional set of parallel batteries may be connected for maintaining full charge voltage of the device. These optional "maintenance charge" batteries may be located within the device housing or external to the device.

Preferred embodiments may also include a special monitor and control circuit board which allows the user to check the voltage of the device prior to use and requiring the user to recharge the device before use if the voltage is too low. When a user decides to employ the device to start an engine and pushes the control button to activate the monitor/control board circuit, power is provided to the control terminal contact 211 for a period of up to 10 minutes, as long as sufficient voltage is available in device to safely start engine without damage to batteries. (A positive voltage is required on contact 211 to cause the aircraft or other vehicle to switch the main power bus over to connect to the external power input, thereby connecting the power from pins 210 and the device to the aircraft or vehicle main power bus. This special control circuit continually monitors the voltage during use of the device and will disable power to the control contact 211 should the output voltage of the device drop below a preset level, thus protecting the batteries in the device from potential damage. Once the control circuit has disabled the power to the control contact 211, the device cannot be used again until it is fully recharged.

Figure 10:
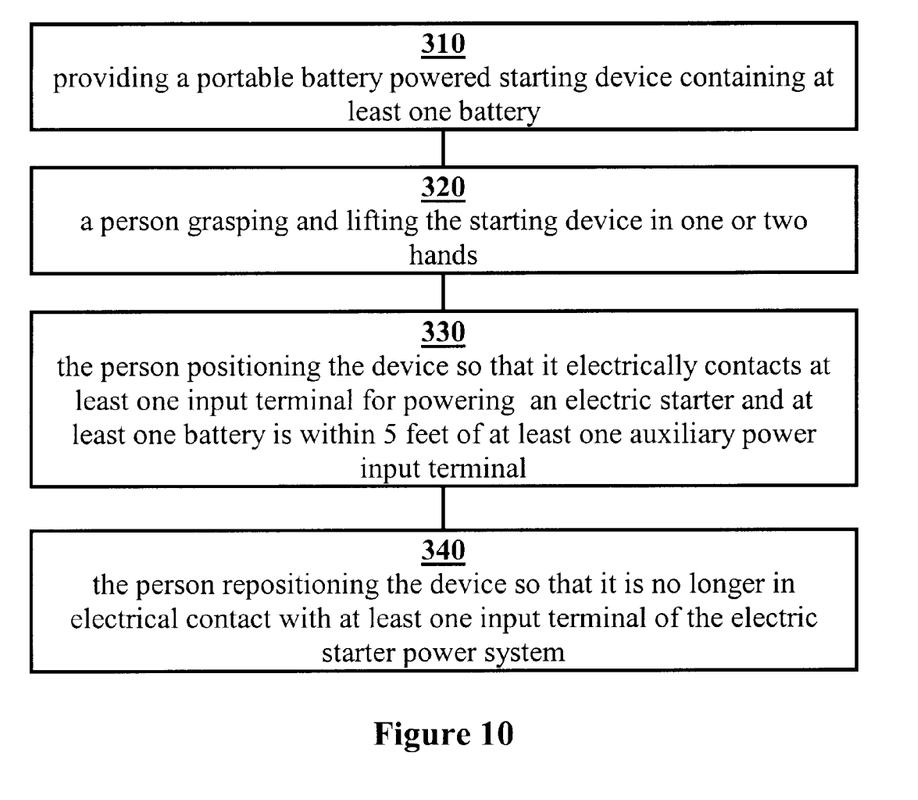
FIG. 10 is a schematic of a method according to the present invention.

Referring to FIG. 10, a method for a person to temporarily provide power to an electric starting motor of an engine comprises the following steps: step 310, providing a portable battery powered starting device containing at least one battery (such as device 10 of FIG. 1); step 320, the person grasping and lifting the starting device in one or two hands; step 330, the person positioning the device so that it electrically contacts at least one input terminal of the external power connector 910 for an apparatus 900 and at least one battery is within Z inches of at least one input terminal where Z is one of 60, 36, 24, 12, 10, 8, 6, 4, and 2; and step 340, the person repositioning the device so that it is no longer in electrical contact with at least one input terminal of the electric starter. In an alternative embodiment, the step of positioning the device may involve lifting the device at least partially over the person's head. It is contemplated that the claimed invention can be advantageously used when apparatus 900 is a vehicle.

Figure 11:
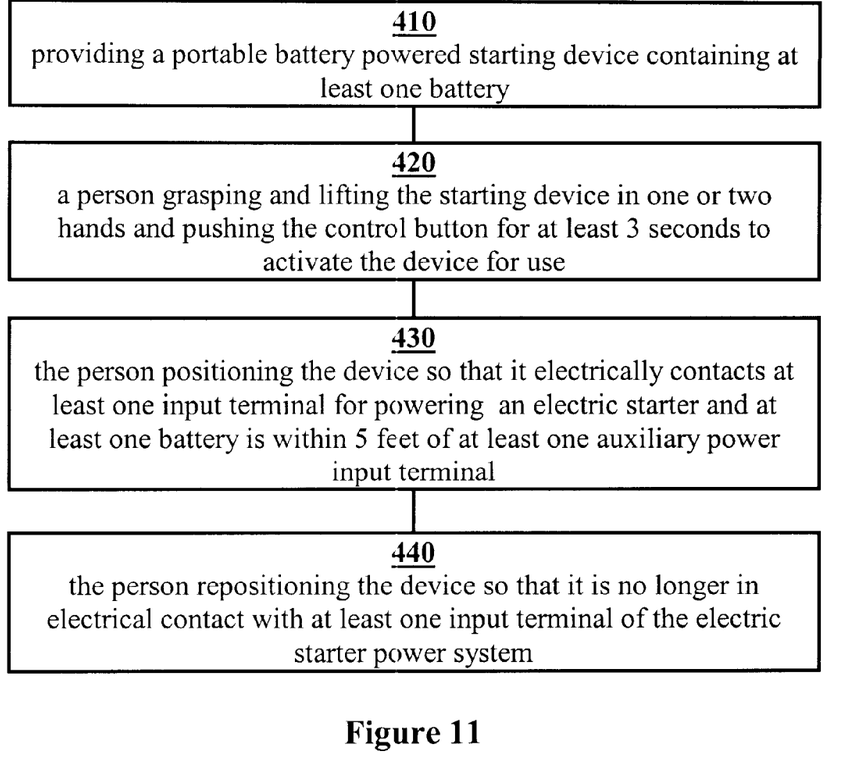
FIG. 11 is a schematic of a preferred method according to the present invention.

Referring to FIG. 11, a preferred method for a person to temporarily provide power to an electric starting motor comprises the following steps: step 410, providing a portable battery powered starting device containing at least one battery (such as device 10 of FIG. 1); step 420, the person pushing down the control button for 3 or more seconds and grasping and lifting the starting device in one or two hands; step 430, the person positioning the device so that it electrically contacts at least one input terminal of the external power connector for an electric starter and the at least one battery is within Z inches of at least one input terminal where Z is one of 60, 36, 24, 12, 10, 8, 6, 4, and 2; and step 440, the person repositioning the device so that it is no longer in electrical contact with the at least one input terminal of the electric starter. In an alternative embodiment, the step of positioning the device may involve lifting the device at least partially over the person's head.

Figure 12:
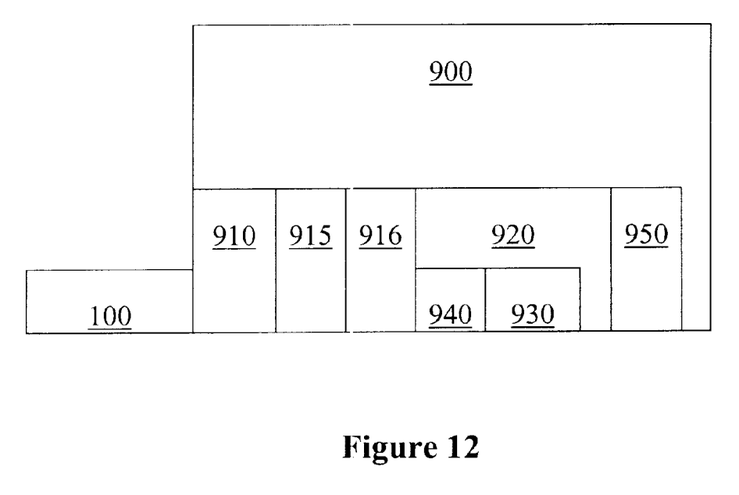
FIG. 12 is a schematic of an apparatus according to the present invention coupled to a starter.

Referring briefly to FIG. 12, in some instances an apparatus 900 may comprise an auxiliary power input 910, a power bus 915, a power solenoid 916 which acts as a switch for controlling whether power from auxiliary power input 910 reaches power bus 915, an electric starter 920 and an engine 950. The electric starter of the vehicle may comprise an electric motor 930 for starting engine 950, and a starter solenoid 940, the starter solenoid 940 coupled to the power bus 915 and acting as a switch for controlling whether power applied to power bus 915 reaches electric motor 930. For such embodiments, a positive voltage on contact 211 activates power solenoid 916 to allow power from the auxiliary power input 910 to pass through the power bus 915 of apparatus 900. Once power is provided to power bus 915, it is available to all systems of apparatus 900 including, when starter solenoid 940 is activated, the electric motor 930.

Thus, specific embodiments and applications of the battery powered cableless starting device have been disclosed. It should be apparent, however, to those skilled in the art that many more modifications besides those already described are possible without departing from the inventive concepts herein. The inventive subject matter, therefore, is not to be restricted except in the spirit of the appended claims.

We claim:

1. A portable battery powered starting device, comprising:
   a battery;
   a connector terminal having a first contact electrically coupled to the battery, and sized and dimensioned to mate with an input terminal of an electric starter of an engine providing at least one horsepower; and
   a coupling mechanism physically limiting a distance measured between the battery and the connector terminal to no more than 36 inches.

2. The device of claim 1 wherein the coupling mechanism comprises a housing that at least partially encloses the battery and the connector terminal.

3. The device of claim 2 wherein the housing is substantially rigid, and the connector terminal is located at an end of the housing.

4. The device of claim 3 wherein the coupling mechanism physically limits the distance measured between the battery and the connector terminal to no more than 60 inches.

5. The device of claim 3 wherein the connector terminal includes a second contact and a third contact, each of which is sized and dimensioned to mate with the starter input terminal.

6. The device of claim 1 wherein the electric starter comprises an electric motor, and the electric starter input terminal is not part of the electric motor.

7. The device of claim 1 wherein the battery is a thin film battery.

8. The device of claim 1 wherein the battery is a lithium ion battery.

9. A portable battery powered starting device, comprising:
   a battery;
   a connector terminal having a first contact electrically coupled to the battery, and sized and dimensioned to mate with an input terminal of an electric starter of an engine providing at least one horsepower; and
   a coupling mechanism physically limiting a distance measured between the battery and the connector terminal to no more than 36 inches;
   wherein the device contains a control contact and a monitor/control circuit for monitoring voltage of the battery, and disabling the control contact if the monitored voltage drops below a threshold.

10. A portable battery powered starting device, comprising:
    a battery;
    a connector terminal having a first contact electrically coupled to the battery, and sized and dimensioned to mate with an input terminal of an electric starter of an engine providing at least one horsepower; and
    a coupling mechanism physically limiting a distance measured between the battery and the connector terminal to no more than 36 inches:
    wherein the coupling mechanism does not comprise a cable.

11. The device of claim 1 wherein the coupling mechanism physically limits the distance measured between the battery and the connector terminal to no more than 24 inches.

12. The device of claim 1 wherein the coupling mechanism physically limits the distance measured between the battery and the connector terminal to no more than 12 inches.

13. The device of claim 1 wherein the coupling mechanism physically limits the distance measured between the battery and the connector terminal to no more than 6 inches.

14. The device of claim 1 wherein the distance between the connector and battery is variable and the coupling mechanism prevents the distance between the battery and the connector terminal from being varied by a factor Y where Y is greater than or equal to 10.

15. The device of claim 1 wherein the distance between the connector and battery is variable and the coupling mechanism prevents the distance between the battery and the connector terminal from being varied by a factor Y where Y is greater than or equal to 5.

16. The device of claim 1 wherein the distance between the connector and battery is variable and the coupling mechanism prevents the distance between the battery and the connector terminal from being varied by a factor Y where Y is greater than or equal to 2.

17. The device of claim 16 wherein the battery is a thin film battery.

18. The device of claim 17 wherein the battery is a lithium ion battery.

19. The device of claim 1 wherein the engine is located in one of an aircraft, a passenger vehicle, an electrical generator, a combine, a tractor, a boat, and a truck.

20. The device of claim 1 wherein the distance between the connector and battery is invariable, the distance being fixed by the coupling mechanism.

\* \* \* \* \*